United States Patent [19]
Kim

[11] Patent Number: 6,023,392
[45] Date of Patent: Feb. 8, 2000

[54] HARD DISK DRIVE COVER HAVING IMPROVED STRUCTURAL AND PRODUCTION CHARACTERISTICS

[75] Inventor: Youn-Tai Kim, Seoul, Rep. of Korea

[73] Assignee: SamSung Electronics Co., Ltd., Kyungki-do, Rep. of Korea

[21] Appl. No.: 09/016,351

[22] Filed: Jan. 30, 1998

[30] Foreign Application Priority Data

Jan. 30, 1997 [KR] Rep. of Korea ................... 97-2764

[51] Int. Cl.[7] ............................................. G11B 5/012
[52] U.S. Cl. ................................... 360/97.01; 29/603.03
[58] Field of Search ......................... 360/97.01, 97.03, 360/98.01; 361/685, 739; 29/603.03

[56] References Cited

U.S. PATENT DOCUMENTS

| | | | |
|---|---|---|---|
| 4,967,293 | 10/1990 | Aruga et al. | 360/106 |
| 5,004,207 | 4/1991 | Ishikawa et al. | 360/97.02 |
| 5,025,335 | 6/1991 | Stefansky | 360/97.01 |
| 5,223,996 | 6/1993 | Read et al. | 360/97.02 |
| 5,282,100 | 1/1994 | Tacklind et al. | 360/97.02 |
| 5,335,124 | 8/1994 | Yokota | 360/99.06 |
| 5,535,092 | 7/1996 | Bang | 361/685 |
| 5,703,734 | 12/1997 | Berberich et al. | 360/97.02 |

*Primary Examiner*—David D. Davis
*Attorney, Agent, or Firm*—Robert E. Bushnell, Esq.

[57] ABSTRACT

A hard disk drive cover is constructed using plastic resin that is injection molded to form the cover. Increased dimensional precision is attained by using injection molded plastic methods. The plastic resin cover is able to attain the requisite rigidity needed to endure vibration by using an inserted reinforcing frame. The rigidity increases the ability of the hard disk drive to endure vibrations and other disturbances, while the decrease in weight, due to use of a plastic resin to form the cover, causes the resonance point to increase. This improves the vibrational characteristics of both the cover and the hard disk drive. Furthermore, the present invention reduces manufacturing costs by eliminating the need to machine the cover prior to assembly and also eliminating the need to apply a special anti-corrosive coating to the cover.

17 Claims, 4 Drawing Sheets

HARD DISK DRIVE COVER HAVING IMPROVED STRUCTURAL AND PRODUCTION CHARACTERISTICS

CLAIM OF PRIORITY

This application makes reference to, incorporates the same herein, and claims all rights accruing thereto under 35 U.S.C. §119 through my patent application entitled *Cover Assembly Having Frame for Hard Disk Drive* earlier filed in the Korean Industrial Property Office on the 30th day of January 1997 and there duly assigned Ser. No. 1997/2764.

BACKGROUND OF THE INVENTION

1. Field of the Invention

The present invention relates to a cover for a hard disk drive and, more particularly, to a cover constructed using plastic resin and a reinforcing frame to reduce the weight of the hard disk drive cover.

2. Background Art

Hard disk drives are widely used as auxiliary memory devices in computer systems to magnetically record data received as a recording apparatus for magnetically recording data received from an external device, such as a host computer, onto a magnetic recording medium, such as a rotating disk, or reading data that has already been recorded on the disk. The hard disk drive includes a housing that has a base and an attached cover, a mechanism unit having a spindle motor for rotatably mounting the magnetic disk, a head for reading and writing data onto the magnetic disk, an actuator and a voice coil motor for controlling the position of the head, and a circuit unit for performing the electrical process and controlling the overall operation of the mechanism unit.

A hard disk drive has a magnetic head attached at the end of an actuator arm that moves over the hard disk drive to read and write information from the disk. The actuator pivots radially around a shaft on a pivot bearing controlled by a voice coil motor. The disk is rotated at high speed by a spindle motor that is attached to the base of the hard disk drive. While the magnetic head writes or reads data from a predetermined track of the disk, the rotation of the disk causes the magnetic head to be hydrodynamically lifted over the surface of the disk by an air bearing. This hydrodynamic lifting results from the flow of air produced by the rotating disk. This air flow causes the magnetic head to float (fly) above the disk surface and allows the head to move over the disk while maintaining a minute gap. During operation, when the hard disk drive is non-operational or during a power down period, the head of the actuator arm is held in position over a parking zone located on the innermost track on the disk. The purpose of adjusting the actuator arm during periods when the disk is not rotating is to prevent data recorded on the disk from being damaged by the magnetic head slapping against the data surface of the disk.

The hard disk drive also uses a flexible printed circuit board that is connected via a signal cable to the magnetic head and a current terminal of the voice coil motor. The cover of the hard disk drive controls vibrations and other disturbances and protects the inside of the hard disk drive by combining with the base to enclose the hard disk drive. As such, the cover must be have sufficient strength to endure the vibration and disturbances that occur during operation. Another consideration when designing hard disk drive covers is the effect of the cover on the vibrations of the hard disk drive. As the weight of the cover increases, the first harmonic frequency is lowered, thus making it easier for the hard disk drive to reach a resonance condition that would interfere with the operation of the hard disk drive.

Some covers which were developed to improve the operation of the hard disk drive are shown, for example, in U.S. Pat. No. 5,004,207 to Ishikawa entitled *Shock Mounting Structure and Magnetic Disk Apparatus*, U.S. Pat. No. 4,967,293 to Aruga entitled *Multi-Positioner Magnetic Disk Storage Apparatus Having Means for Reducing Mechanical Vibration Interference Between Positioners*, U.S. Pat. No. 5,223,996 to Read entitled *Combined Shock Mount Frame and Seal for a Rigid Disk Drive*, U.S. Pat. No. 5,703,734 to Berberich entitled *Disc-Drive Having an Integral Gasket and Continuous Outer Perimeter Shock Bumper*, and U.S. Pat. No. 5,535,092 to Bang entitled *Apparatus for Reducing Impacts on a Hard Disk Assembly*. Contemporary hard disk drive covers are unable to produce a cover with improved vibrational characteristics without requiring expensive machining or special anti-corrosive coatings. Manufacturers have also tried changing the shape of the hard disk drive cover to a more simple design using a press, but that has not led to a difference in the weight of covers and to an improvement in the vibrational characteristics of the hard disk drive.

U.S. Pat. No. 5,025,335 to Stefansky entitled *Architecture for 2½ Inch Diameter Single Disk Drive*, mentions a disk drive cover and bottom made out of injection molded plastic that uses a combination of mounting posts and a closed loop, embedded servo tracking system to compensate for the lack of structural rigidity of plastic. The combination of the two adjustments is an improvement of several existing components to compensate for the vibrational characteristics of a plastic housing, rather than a new structural design to improve the vibrational characteristics. The manufacturing of a cover with mounting posts that mate with a printed circuit board increases the cost of manufacturing while reducing the amount of dimensional tolerance that can occur without interfering with the assembly of the disk drive.

Currently, the majority of hard disk drive manufacturers use a die-casting method and aluminum material to produce a cover. Since the aluminum die-casting process uses an injection molding process, pores are formed in the inside that can change the properties of the aluminum material and cause either corrosion or outgasing. To compensate for this deficiency, an E- coating technique is often used after the injection molding process. Not only does the E-coating technique raise the cost of production, but due to out gassing problems manufacturers are trying to find another coating technique. Due to the dimensional imprecision of die-casting, a cover is not ready for use until it has been machined after injection into the die cast. The machining of the cover causes contamination in the inside of the hard disk drive, thus lowering the reliability of the hard disk drive, or in a clean room due to particles that have been machined off of the hard disk drive. Additionally, the required machining process further increases the cost of producing the hard disk drive.

Die-casting using a magnesium material has also been developed to try to improve the vibrational characteristics of the hard disk drive, but magnesium's susceptibility to corrosion has made it problematic to use a cover substantially composed of magnesium. Hard disk drive manufacturers continue to make every possible effort to minimize vibrational characteristic problems while providing the necessary protection to the hard disk drive, but it is still not easy to find a solution to the problem.

I believe it may be possible to provide a hard disk drive that is an improvement over those currently used by manufacturers. A hard disk drive that is made of a light weight material and reinforced with a frame, that does not use the die cast method, that does not require using machining, and that does not require an expensive coating process would decrease the cost of manufacturing the hard disk drives, that does not require the extra steps involved with using mounting posts, that can use plastic of a lower rigidity than otherwise possible if not for the reinforcing frame, that improves the reliability of hard disk drives using plastic covers, and improves the vibrational characteristics of hard disk drives.

SUMMARY OF THE INVENTION

Accordingly, it is an object of the present invention to provide an improved plastic resin hard disk cover.

It is another object to provide a hard disk drive cover that has increased dimensional precision, thus eliminating the machining step during the assembly of the hard disk drive.

It is still another object to provide a hard disk drive cover that has improved vibrational characteristics.

It is yet another object to provide a hard disk drive cover that has good anti-corrosive properties, thus eliminating the need to apply a special coating to the hard disk drive cover.

It is still yet another object to provide a hard disk drive cover that has a reduced cost of production.

It is a further object to provide a hard disk drive cover that increases the efficiency of hard disk drive production.

It is a further object to provide a hard disk drive cover that can use plastics previously unsuitable for use as hard disk drive covers due to an improved apparatus for increasing rigidity.

It is a further object to provide a hard disk drive cover that improves the vibrational characteristics of injection molded plastic without increasing the dimensional precision that must be maintained throughout the assembly process.

These and other objects can be achieved by constructing a hard disk drive using a plastic resin and a stainless steel or alloy frame. The plastic resin is lighter than conventional metallic covers, thus lowering the weight of the hard disk drive. By lowering the weight of the hard disk drive, the resonant frequencies are increased, thus improving the vibrational characteristics of the hard disk drive. The frame is inserted over the disk drive to reinforce the cover and increase its rigidity without overly increasing the weight of the hard disk drive. The cover can be constructed using plastic injection molding. This allows the cover to be constructed with improved dimensional accuracy, superior to that of die-casting. The frame has perforations to decrease weight and a plurality of elongated portions that are fastened at contact points between the base and the cover of the hard disk drive.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
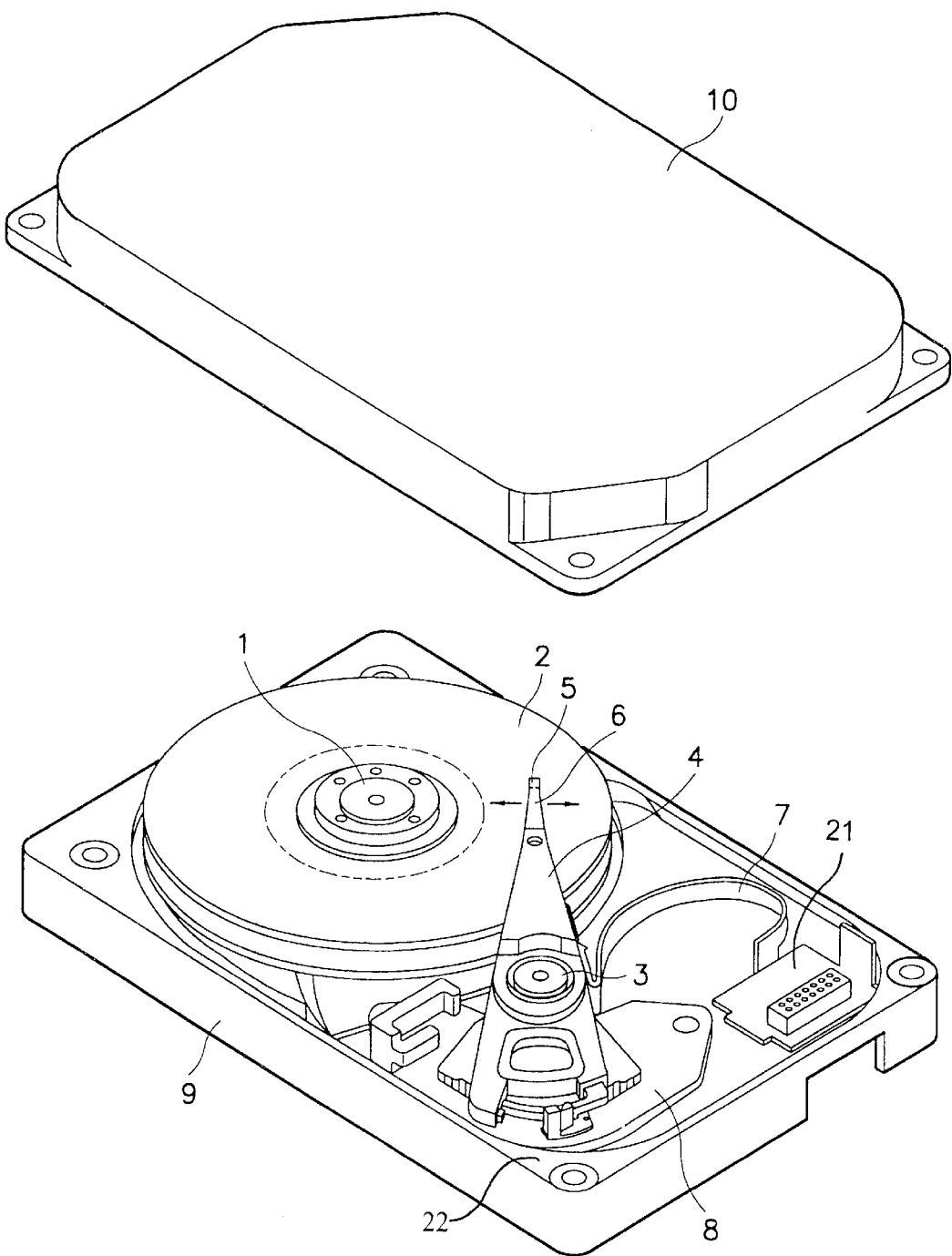
FIG. 1 is an exploded perspective view of a hard disk drive with its cover removed.

Turning now to the drawings, FIG. 1 illustrates a hard disk drive that has magnetic head 5 attached at the end of actuator arm 4 that moves over the hard disk drive to read and write information from disk 2. Actuator arm 4 pivots radially around shaft 3 that is on a pivot bearing controlled by voice coil motor 8. Disk 2 is rotated at high speed by spindle motor 1 that is attached to the base of the hard disk drive. While magnetic head 5 writes or reads data from a predetermined track of disk 2, the rotation of the disk 2 causes magnetic head 5 to be hydrodynamically lifted over the surface of the disk 2 by an air bearing. This hydrodynamic lifting results from the flow of air produced by the rotating disk 2. This air flow causes magnetic head 5 to float (fly) above disk 2's surface and allows magnetic head 5 to move over disk 2 while maintaining a minute gap. During operation, when the hard disk drive is non-operational or during a power down period, magnetic head 5 of actuator arm 4 is held in position over a parking zone located on the innermost track on disk 2. The purpose of adjusting actuator arm 4 during periods when disk 2 is not rotating is to prevent data recorded on the disk 2 from being damaged by magnetic head 5 slapping against the data surface of disk 2.

The hard disk drive also uses a flexible printed circuit board 21 that is connected via signal cable 7 to magnetic head 5 and a current terminal of the voice coil motor 8. Cover 10 of the hard disk drive controls vibrations and other disturbances and protects the inside of the hard disk drive by combining with the base to enclose the hard disk drive.

Figure 2:
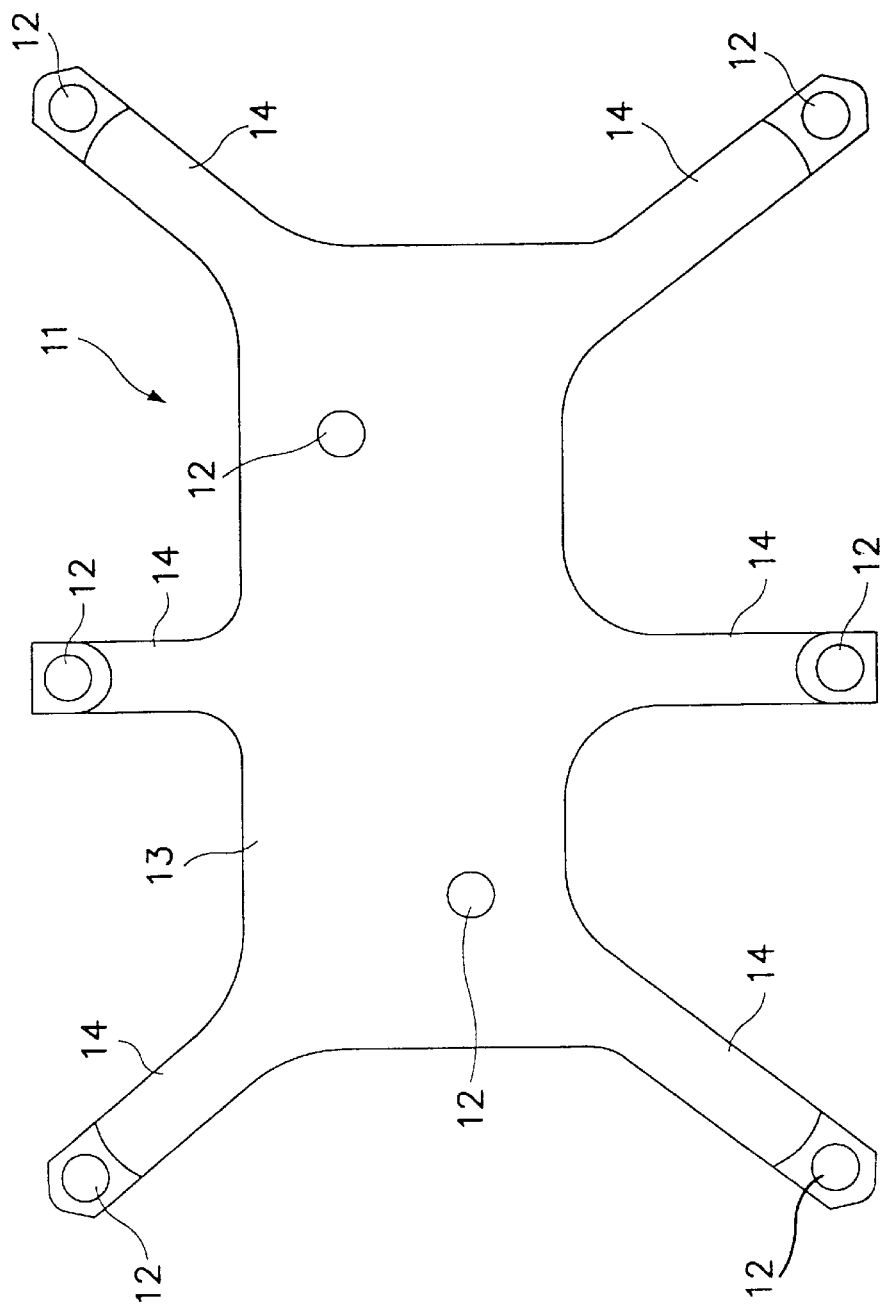
FIG. 2 is a plan view of the frame that is mounted in a hard disk drive constructed according to the principles of the present invention.
Figure 3:
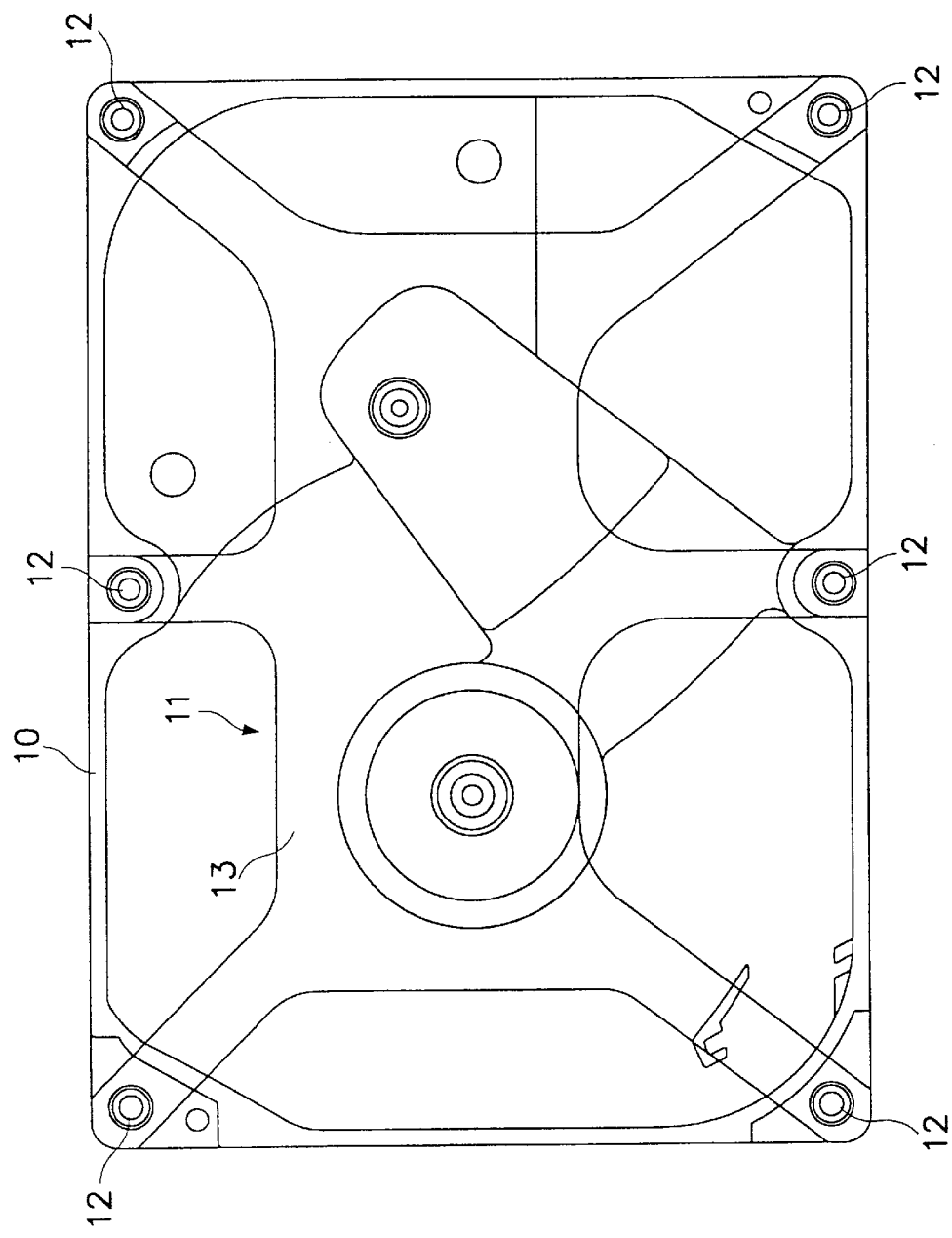
FIG. 3 is a bottom view of the cover of FIG. 2 with a frame mounted to the cover for a hard disk drive.
Figure 4:
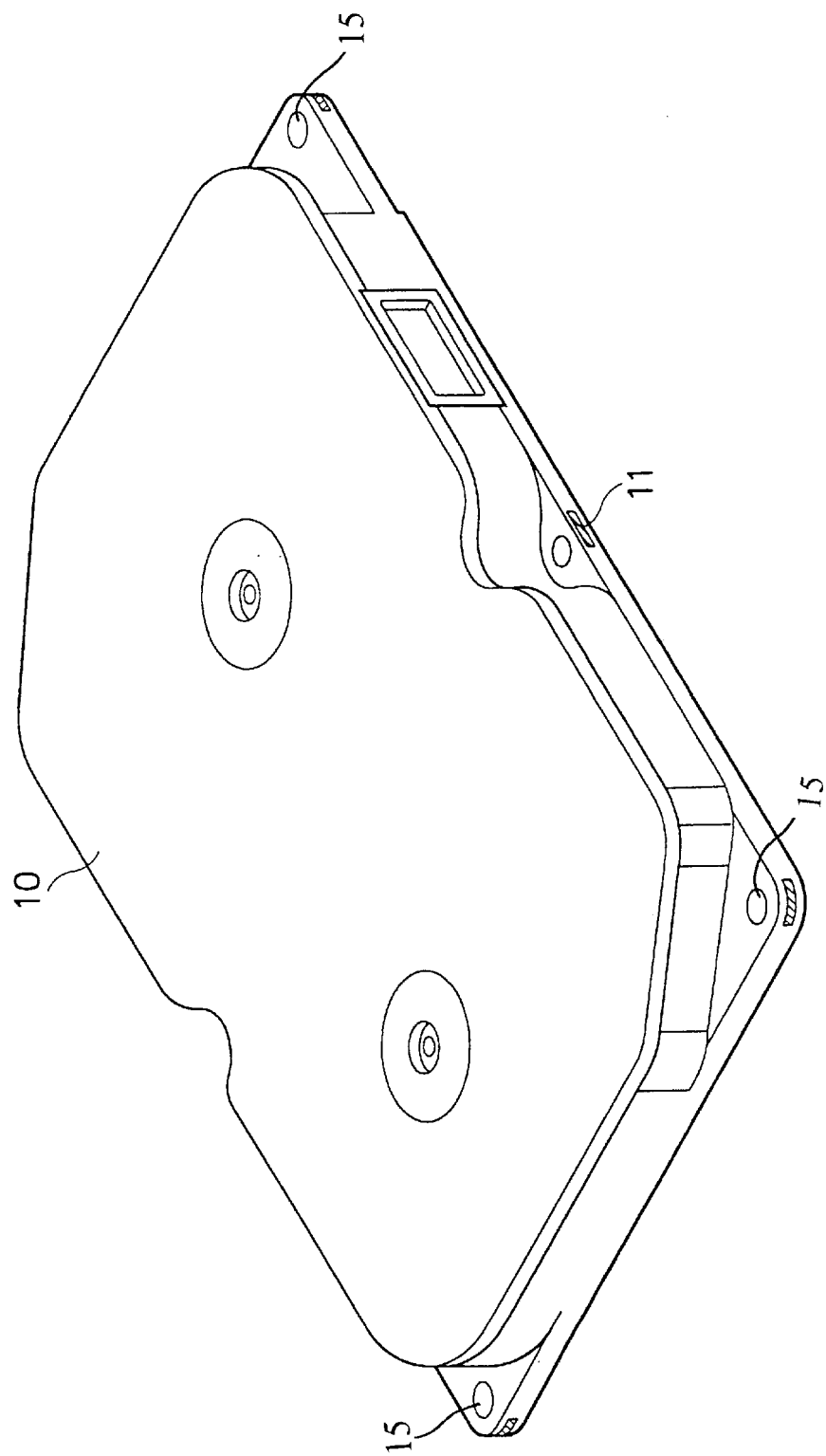
FIG. 4 is a perspective view of the cover of FIG. 2 with a reinforcing frame attached.

The cover as constructed according to the principles of the present invention utilizes a plastic material that is reinforced by a frame that is attached to the inside of the cover. This frame is shown in FIG. 2. FIG. 3 shows a bottom view of a cover with a frame mounted inside and FIG. 4 is shows a top view of a cover that has a reinforcing frame attached.

Cover 10 (FIG. 3) is engaged with base 9 (FIG. 1) and constructed from plastic resin using an injection molding process to allow the dimensional accuracy of the cover 10 to be improved. To increase the rigidity of the plastic material, a steel or alloy frame 11 (FIG. 2) can be attached inside cover 10. Cover 10 is formed integrally with frame 11 to intensify the rigidity of cover 10 and prevent corrosion.

As shown in FIG. 2, frame 11 has reinforcement portion 13, that has two holes 12 formed inside, and elongated extended bands 14. Preferably, there are 6 elongated extended bands that extend radially outward from reinforcement portion 13. Each of extended bands 14 has hole 12 positioned near a distal end to engage the inner side of cover 10 (FIG. 3) and the upper side 22 of base 9 (FIG. 1).

The cover 10 is manufactured using the injection molding process. Holes 12 are formed in frame 11 by using intermediate insertions, driven by a press, that perforate through the surface of frame 11. Frame 11 may be constructed from stainless steel to intensify the rigidity of cover 10 and prevent corrosion of the frame. Frame 11 is perforated using a press and inserted in a mold of cover 10. Then a material that is not susceptible to vibration, such as resin or VECTRA, is injected into the mold, thus forming the vibration resistant material into the shape of cover 10. VECTRA is a thermoplastic material with a Rockwell hardness of 84 on an M scale and a tensile impact strength of 2,300 J/m. At normal temperatures the strength and modulus values for VECTRA are high and comparable with those of ABS resins. As shown in FIG. 4, cover 10 is formed around the ends of frame 11, while fastening holes 15 in the cover are aligned with holes 12 in frame 11 to secure the cover and the frame to the base of the hard disk drive.

As previously discussed, cover 10 may be formed using a plastic material. More specifically, it is preferable to use an anti-vibration plastic resin material. This allows cover 10 to be used as a component for absorbing vibration and also reduces the weight of cover 10. The reduction of the weight of cover 10 makes the cover's resonance point increase, thus improving the vibration characteristics of the hard disk drive. In addition, the use of a stainless steel frame 11 further increases the rigidity of the cover 10. This reinforces the otherwise weaker portions of cover 10. Cover 10's high dimensional accuracy, due to the injection molding process, eliminates the need to do any machining of the cover 10 before completing the assembly of the hard disk drive. This will reduce the cost of production and prevent the contamination of hard disk drives by particles of the cover 10 that are machined off of the cover 10 to bring its dimensions within predetermined tolerances. Furthermore, the use of a plastic resin coating eliminates the out gassing problem, thus eliminating the necessity of applying a special coating to the cover 10.

As described above, the hard disk drive cover of the present invention achieves increased dimensional precision by using injection molded plastic methods. The plastic resin cover is able to attain the requisite rigidity due to the insertion of a reinforcing frame. The rigidity increases the ability of the hard disk drive to endure vibrations and other disturbances, while the decrease in weight, due to use of a plastic resin to form the cover, causes the resonance point to increase. This improves the vibrational characteristics of both the cover and the hard disk drive. Furthermore, the present invention reduces manufacturing costs by eliminating the need to machine the cover prior to assembly and also eliminating the need to apply a special anti-corrosive coating to the cover.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A cover connected to a base for a hard disk drive, comprising:

said base having a mounted hard disk drive assembly comprising an actuator, a motor driving said actuator, a disk for storing data, and a head supported on said actuator for reading data from said disk;

a frame reinforcing said cover, said frame having a plurality of elongated bands that extend radially outward to engage a plurality of edges of said cover, each of said elongated bands having a perforation in a distal end of said each of said elongated bands to fastenably engage with said base; and said cover constructed of an injection molded plastic resin material, said cover being molded around an end of each of said elongated bands, said cover having a plurality of bores that align with said perforation in said distal end of each of said elongated bands of said frame to fasten both said frame and said cover to said base of said hard disk drive.

2. The cover of claim 1, wherein said plurality of elongated bands extend radially outward from a central portion of said frame, each said distal end of said elongated bands engaging said cover.

3. The cover of claim 2, further comprised of said frame being constructed from stainless steel to prevent corrosion.

4. The cover of claim 3, further comprised of said central portion of said frame including at least two perforations.

5. The cover of claim 1, further comprised of said frame being formed as a single piece constituting a single unit and having at least six outwardly protruding elongated bands.

6. A process for making a cover for a hard disk drive, comprising the steps of:

forming a base having a mounted hard disk drive assembly comprising an actuator, a motor driving said actuator, a disk for storing data, and a head supported on said actuator for reading data from said disk;

inserting a frame into a mold for said cover for said hard disk drive, said frame being formed of a single structure constituting a single unit and having a plurality of elongated bands that extend radially outward to engage a plurality of edges of said cover, each of said elongated bands having a perforation in a distal end to fastenably engage with said base; and injecting a plastic resin into said mold to form a cover reinforced by said frame, said cover being molded around an end of each of said elongated bands, said cover having a plurality of bores that align with said perforation in said distal end of each of said elongated bands of said frame to fasten both said frame and said cover to said base of said hard disk drive.

7. The process of claim 6, further comprising the step of punching a plurality of bores in said frame prior to inserting said frame into said mold.

8. The process of claim 6, further comprised of said frame having a plurality of elongated bands that extend radially outward from a central portion, each said distal end of said elongated bands engaging said cover and having a circular perforation in said distal end of each of said elongated bands for fastening both said frame and said cover to said base.

9. The process of claim 6, further comprised of said frame being constructed from stainless steel.

10. A hard disk drive having a cover with improved vibrational characteristics, comprising:

a base having a mounted hard disk drive assembly comprising an actuator, a motor driving said actuator, a disk for storing data, and a head supported on said actuator for reading data from said disk;

a plate reinforcing said cover and constructed of a single piece of stainless steel constituting a single unit, said plate having a plurality of perforations forming a central portion in said plate with a plurality of elongated bands radially protruding outwards to engage said cover, said elongated bands each having a bore in a distal end for fastenably engaging with said base; and said cover constructed of a plastic resin material injection molded around an end of each of said elongated bands of said plate, said cover having a plurality of hollows that align with said bore in said distal end of each of said elongated bands of said plate to fasten both said plate and said cover to said base of said hard disk drive.

11. The hard disk drive of claim 10, further comprised of said plate having a central portion having at least two perforations.

12. The hard disk drive of claim 11, further comprised of said plurality of elongated bands comprising at least six elongated bands extending outward from said central portion of said plate to fasten to both said cover and said base of said hard disk drive.

13. A cover for a hard disk drive having improved vibrational characteristics, comprising:
- a base having a mounted hard disk drive assembly comprising an actuator, a motor driving said actuator, a disk for storing data, and a head supported on said actuator for reading data from said disk;
- a frame reinforcing said cover, said frame formed of a single piece constituting a single unit and having at least six elongated bands that extend radially outward from a central portion of said frame to engage a plurality of edges of said cover, each of said at least six elongated bands having a hollow in a distal end of said each of said at least six elongated bands to fastenably engage with said base; and
- said cover being constructed of a plastic resin material, said edges of said cover encircling an end of each of said elongated bands to secure said frame to said cover, said cover having a plurality of bores that align with said hollow in said distal end of said each of said elongated bands of said frame to fasten both said frame and said cover to said base of said hard disk drive.

14. The cover of claim 13, each said distal end of said each of said at least six elongated bands engaging said cover.

15. The cover of claim 14, further comprised of said frame being constructed from stainless steel to prevent corrosion.

16. The cover of claim 15, further comprised of said central portion of said frame including at least two perforations.

17. The cover of claim 13, further comprised of said cover being constructed by injection molding.

* * * * *